United States Patent
Hentschel et al.

(10) Patent No.: US 7,887,030 B2
(45) Date of Patent: Feb. 15, 2011

(54) WET/DRY COOLING TOWER AND METHOD

(75) Inventors: Gregory P. Hentschel, Olathe, KS (US); Scott T. Maurer, Overland Park, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 411 days.

(21) Appl. No.: 12/123,194

(22) Filed: May 19, 2008

(65) Prior Publication Data

US 2009/0283245 A1 Nov. 19, 2009

(51) Int. Cl.
*B01F 3/04* (2006.01)

(52) U.S. Cl. ............... 261/109; 165/900; 261/110; 261/158; 261/159; 261/DIG. 11; 261/DIG. 77

(58) Field of Classification Search ......... 261/109–111, 261/112.1, 112.2, 158, 159, DIG. 11, DIG. 77; 165/60, 900
See application file for complete search history.

(56) References Cited

U.S. PATENT DOCUMENTS

| | | | | |
|---|---|---|---|---|
| 2,247,514 A | * | 7/1941 | Mart | 261/147 |
| 3,831,667 A | * | 8/1974 | Kilgore et al. | 165/96 |
| 3,865,911 A | * | 2/1975 | Lefevre | 261/140.1 |
| 3,925,523 A | | 12/1975 | Cates | |
| 3,982,914 A | * | 9/1976 | Grimble | 96/356 |
| 4,098,854 A | * | 7/1978 | Knirsch et al. | 261/161 |
| 4,119,140 A | | 10/1978 | Cates | |
| 4,157,368 A | * | 6/1979 | Fernandes | 261/155 |
| 4,218,408 A | * | 8/1980 | Henning et al. | 261/112.2 |
| 5,028,356 A | | 7/1991 | Wiltz | |
| 5,944,094 A | | 8/1999 | Kinney, Jr. et al. | |
| 6,070,860 A | | 6/2000 | Kinney, Jr. et al. | |
| 6,142,219 A | | 11/2000 | Korenic et al. | |
| 6,702,004 B2 | | 3/2004 | Stratman et al. | |
| 2006/0197241 A1 | * | 9/2006 | Brenneke et al. | 261/152 |
| 2007/0187851 A1 | * | 8/2007 | Facius et al. | 261/161 |
| 2007/0241468 A1 | | 10/2007 | Kammerzell | |

FOREIGN PATENT DOCUMENTS

JP 52-64040 A * 5/1977

* cited by examiner

*Primary Examiner*—Richard L Chiesa
(74) *Attorney, Agent, or Firm*—Baker & Hostetler LLP

(57) ABSTRACT

An atmospheric cooling tower apparatus includes a housing structure having an air inlet and an air outlet, a first evaporative heat transfer media disposed in the housing, and a closed coil heat transfer media disposed in the housing. A water distribution assembly is disposed above the evaporative heat transfer media and configured to distribute water onto the evaporative fill heat transfer fill media. A collection basin is disposed beneath the evaporative heat transfer media configured to collect water that has passed through the evaporative heat transfer media. A first control valve controls an inflow of water to supply water to one or both of the evaporative heat transfer media and the closed coil heat transfer media. The closed coil heat transfer media and the evaporative heat transfer media are disposed laterally next to each other.

21 Claims, 7 Drawing Sheets

WET/DRY COOLING TOWER AND METHOD

FIELD OF THE INVENTION

The invention pertains generally to the field of cooling towers which cool a warm liquid by interaction with cooler ambient air.

BACKGROUND OF THE INVENTION

Cooling towers are in wide use in industry. These towers are typically used to receive a warm or relatively warm fluid, such as, for example, warm water from an industrial operation. The warm water is passed through the tower and, by a heat exchange interaction with ambient air that is cooler than the water, the water is cooled and then can be discharged or returned to the industrial operation. Cooling towers include various configurations such as cross-flow cooling towers in which the air enters from a side of the tower and passes generally laterally horizontally across the fill media, and also counterflow cooling towers where the air generally enters beneath the fill material and is drawn upward through the fill material.

There are at least two general types of such cooling towers. The first general category includes evaporative type systems in which the water enters the top of the tower and falls through the tower while interacting with splash bars and/or sheet fill packs, also referred to herein as wet media. The water itself thus has contact with the ambient air and is cooled by its contact with the air, and then is collected in a lower collection basin. Evaporative cooling towers can take many configurations, and typically utilize a fan to move air through the tower and past the liquid being cooled, although natural draft cooling towers without fans are also known.

In evaporative cooling towers, depending on the operating and ambient conditions, some of the water will tend to evaporate and exit the tower with the exiting air. In some cases, the water vapor may exit the tower in the form of a visible water vapor or plume which is sometimes considered undesirable depending on location and other circumstances.

Another general category of cooling towers is closed circuit or dry cooling towers. A dry cooling tower contains the liquid to be cooled inside a conduit and air interacts with the conduit material and thus cools the liquid. The dry approach has the advantage that there is no evaporation into the cooling air and thus no plume. However, depending on the operating and ambient temperatures, in some cases dry cooling can be less efficient than wet cooling in terms of the energy consumption and/or construction expense of the tower. Moreover, dry cooling tends in some circumstances to be more dependent on the ambient temperature, and thus less suitable for climates where the weather and ambient temperature change through a wide range. Dry cooling towers can also use one or more fans or can be natural draft.

There are also known so-called hybrid towers which pass the fluid through a combination of evaporative and dry heat exchangers. In the prior art these combination or hybrid cooling towers have operated in a single mode where the water passes serially through one type of heat exchanger media (wet or dry) and then is recollected and passes through a second different type of heat exchanger media (wet or dry). The water travels serially through the two heat exchangers. Turning to air flow, it has been known to arrange the media so that each heat exchanger is contacted by its own air path. That is, the air paths through the two types of heat exchangers are separated from each other, at least to some extent, and thus the air itself passes through one or the other media section in a parallel fashion. In the parallel fashion of air flow, one air stream passes through one media and a second different air stream passes through the other media. It has been known to subsequently mix these two air streams for discharge from the tower. A potential difficulty in operating and designing such hybrid systems is that the optimum configuration for reducing plume is dependent on the operating and ambient temperatures, and when these temperatures vary, for example due to seasonal changes, there can be too much plume, or less than optimal efficiency.

Accordingly, it would be desirable to have a cooling tower that can provide desirable efficiencies while also reducing plume.

SUMMARY OF THE INVENTION

Some embodiments according to the present invention provide a cooling tower and method that can provide desirable efficiencies while also reducing plume.

An atmospheric cooling tower apparatus includes a housing structure having an air inlet and an air outlet, a first evaporative heat transfer media disposed in the housing, a closed coil heat transfer media disposed in the housing, a first water distribution assembly disposed above the first evaporative heat transfer media configured to distribute water onto the first evaporative fill heat transfer fill media, a first collection basin disposed beneath the first evaporative heat transfer media configured to collect water that has passed through the first evaporative heat transfer media, a first control valve that controls an inflow of water to supply water to one or both of the first evaporative heat transfer media and the closed coil heat transfer media, wherein the first control valve has one position where all of the water is supplied to the first evaporative heat transfer media, and another position where all of the water is supplied to the closed coil heat transfer media, wherein the closed coil heat transfer media and the first evaporative heat transfer media are disposed laterally next to each other and wherein a first air path is defined between the first water distribution assembly and the first collection basin, through the first evaporative heat transfer media, and through the closed coil heat transfer media.

Another embodiment includes an atmospheric cooling tower apparatus with a housing means having an air inlet and an air outlet, a first evaporative heat transfer means disposed in the housing, a closed coil heat transfer means disposed in the housing, a first water distribution means disposed above the first evaporative heat transfer means configured to distribute water onto the first evaporative fill heat transfer fill means, a first collection means disposed beneath the first evaporative heat transfer means configured to collect water that has passed through the first evaporative heat transfer means, a first control valve means that controls an inflow of water to supply water to one or both of the first evaporative heat transfer means and the closed coil heat transfer means, wherein the first control valve means has one position where all of the water is supplied to the first evaporative heat transfer means, and another position where all of the water is supplied to the closed coil heat transfer means, wherein the closed coil heat transfer means and the first evaporative heat transfer means are disposed laterally next to each other and wherein a first air path is defined between the first water distribution means and the first collection means, through the first evaporative heat transfer means, and through the closed coil heat transfer means.

Yet another embodiment of the atmospheric cooling method for a tower apparatus having a housing structure having an air inlet and an air outlet, includes distributing water to a first evaporative heat transfer media disposed in the housing using a first water distribution assembly disposed above the first evaporative heat transfer media configured to distribute water onto the first evaporative fill heat transfer fill media, distributing water to a closed coil heat transfer media disposed in the housing, collecting water using a first collection basin disposed beneath the first evaporative heat transfer media configured to collect water that has passed through the first evaporative heat transfer media, controlling an inflow of water to supply water to one or both of the first evaporative heat transfer media and the closed coil heat transfer media using a first control valve, wherein the first control valve has one position where all of the water is supplied to the first evaporative heat transfer media, and another position where all of the water is supplied to the closed coil heat transfer media, wherein the closed coil heat transfer media and the first evaporative heat transfer media are disposed laterally next to each other and wherein a first air path is defined between the first water distribution assembly and the first collection basin, through the first evaporative heat transfer media, and through the closed coil heat transfer media.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
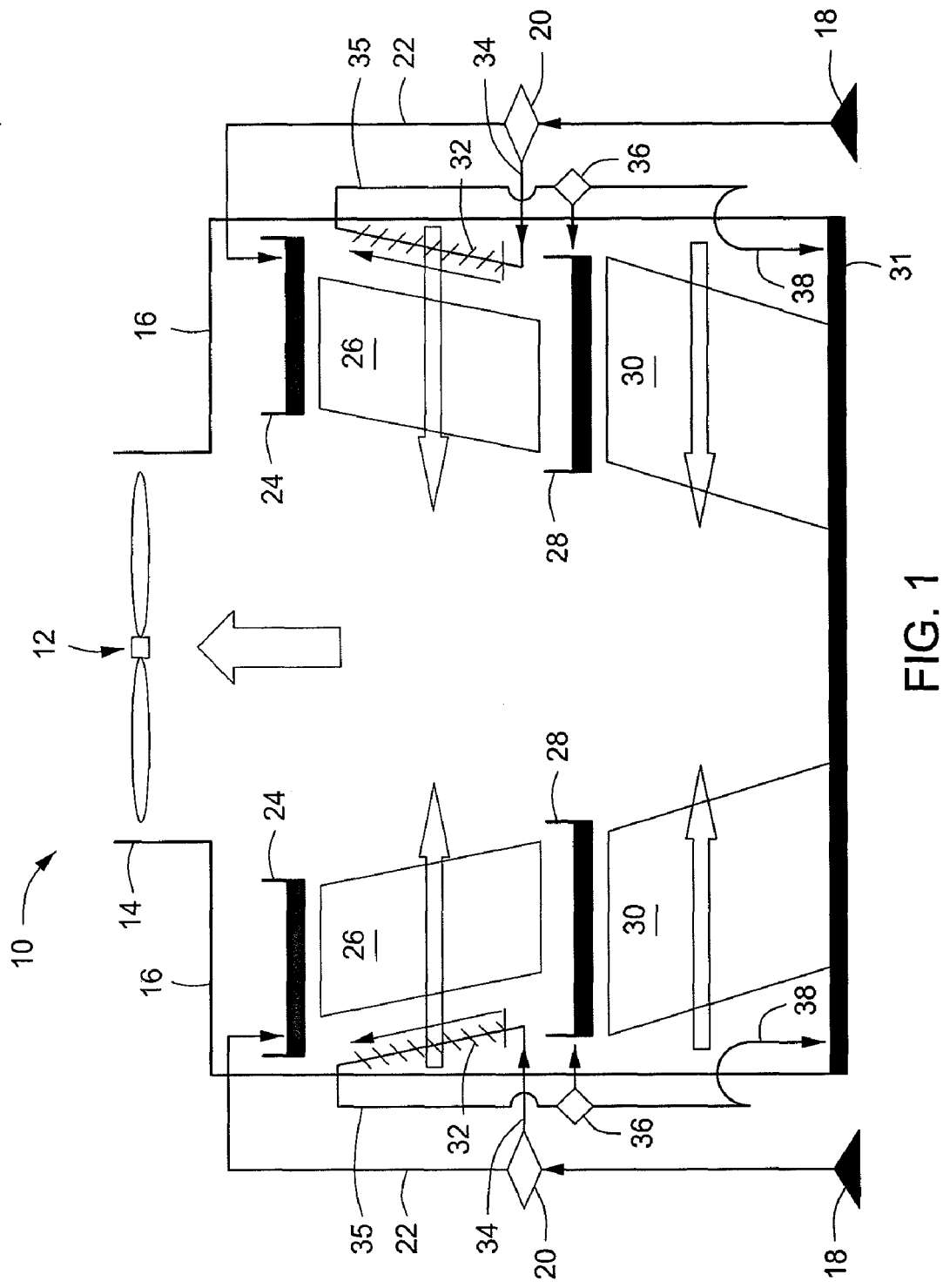
FIG. 1 is a schematic and cross-sectional view providing a diagram of a cooling tower according to a first preferred embodiment of the invention.

Some embodiments according to the invention provide a cooling tower and method that can provide desirable efficiencies while also reducing plume. Examples of preferred embodiments will now be described with reference to the drawing figures, in which like reference numbers refer to like parts throughout.

FIG. 1 is a schematic diagram of a first preferred embodiment of the invention. In this embodiment, a generally or completely symmetrical structure is provided, where air enters the side of the tower 10, passes through various media, as shown, and exits out the top of the tower 10. The cooling tower 10 includes a fan 12 which draws air out of an air outlet structure 14. The tower 10 also has an internal framework (not illustrated) which supports the various components that will be discussed. The tower 10 may have a basin cover 16 forming a roof of the tower, or may simply have an open roof. Turning next to the water flow, relatively warm water or other liquid to be cooled is supplied to the tower via water inlet conduit 18, as shown. The tower 10 has two sides which are essentially mirror images of each other. For convenience, one side is discussed below, and both sides have reference numbers.

The water supplied to inlet 18, which is referred to herein as inlet water, may in some exemplary industrial applications may range from 80° F. to 120° F. Although water is described in the following examples, various embodiments can be used with other fluids, including treated water or other liquids, any or all of which are referred to as water herein. The inlet hot water is passed to a three-way diverter valve, or control valve 20. The operation of this control valve 20 will be discussed in more detail below. In one configuration, the control valve 20 directs all or some of the water through a conduit 22 so that it enters an upper water distribution basin 24. The water distribution basin 24, for example, can take the form of a tray having nozzles therethrough so that water is collected in the water distribution basin 24 and drips downward from the nozzles of the tray in a distributed fashion.

As it drops, the water will contact and pass through an upper heat exchange media 26. The upper heat exchange media 26 in this example is an evaporative fill media such as a series of splash bars or a sheet fill pack.

After falling through the evaporative media 26, the water is collected in an intermediate distribution tray, or re-distribution tray, 28. The re-distribution tray 28 is similar in structure to distribution tray 24. The water in the re-distribution tray 28 falls downward onto a lower heat transfer media 30, which in this example is also an evaporative media such as a splash bar or sheet fill pack media. Some embodiments thus have both upper and lower evaporative media. Moreover, in some embodiments having both of these be a film fill type media is also preferred. However, as will be illustrated for example with respect to a version of the second embodiment, shown in FIGS. 5 and 6, there may be instances where one or the other of the upper media 26 or the lower media 30 may be a closed dry media, such as a coil type. Also either of the upper media 26 and lower media 30 can be a compound media, wherein liquid is to be cooled passing through a coil and also another liquid is being sprayed over the coil.

Returning to FIG. 1, a lower water collection basin 31 is located at the bottom of the tower 10 to collect water for discharge from the tower. After being cooled, the water is collected in the lower water collection basin 31. The water in the water collection basin 31 can be extracted by a pump or gravity flow and returned to the process location or exhausted into the environment.

The control valve 20 may also direct the water into a conduit 34 where it enters a closed circuit heat transfer coil 32. This water travels through the coil 32 and is cooled by the coil operating as a closed circuit heat exchanger with the ambient air. The water exits the coil 32 via conduit 35 at which point it can be collected by the re-distribution tray 28. In an example of an optional embodiment, the discharge conduit of the coil 32 may be connected to a second control valve 36 which can divert the water leaving the coil 32 so that instead of entering the re-distribution basin 28, it instead is directed to a bypass conduit 38 which directs the water directly to the lower water collection basin 31, and thus the water bypasses the intermediate collection basin 28 in this mode. This feature is optional as are many other features described herein, such as for example a purely closed loop mode that is discussed farther below.

Continuing with FIG. 1, it will be appreciated that when the control valve 20 is a gradual diverter valve, it can gradually shift the operation of the upper section of the tower such that the water flow can transition between (1) a fully evaporative condition (with all the water entering the conduit 22, the top distribution basin 24, and passing through the media 26 to be collected in the intermediate tray 28), and (2) when the valve is operated in completely the other direction, the top section of the tower operates as a purely closed circuit tower (with all of the water being directed through the coil 32 and exiting the coil 32 and upon exit of the coil 32, depending on the condition of the secondary valve 36, the water being directed either into the intermediate distribution tray 28 or sent directly to the lower water basin 31).

The top section of the tower 10 can also be operated with the inlet water supply being split fractionally as a percentage by the control valve 20 so that some of the water is operating in an evaporative condition through the media 26 and another proportion of the water is operating in a closed dry configuration through the coil 32. Again, water may be sent after it has passed through the coil 32 either through the lower media 30 or can bypass the lower media 30 directly into the lower basin 31. The coil 32 is illustrated as being outward of the media 26; however, if desired the coil 32 can be inbound of the media 26, which may have benefits such as protection of the coil 32 from the elements and/or external debris.

Figure 2:
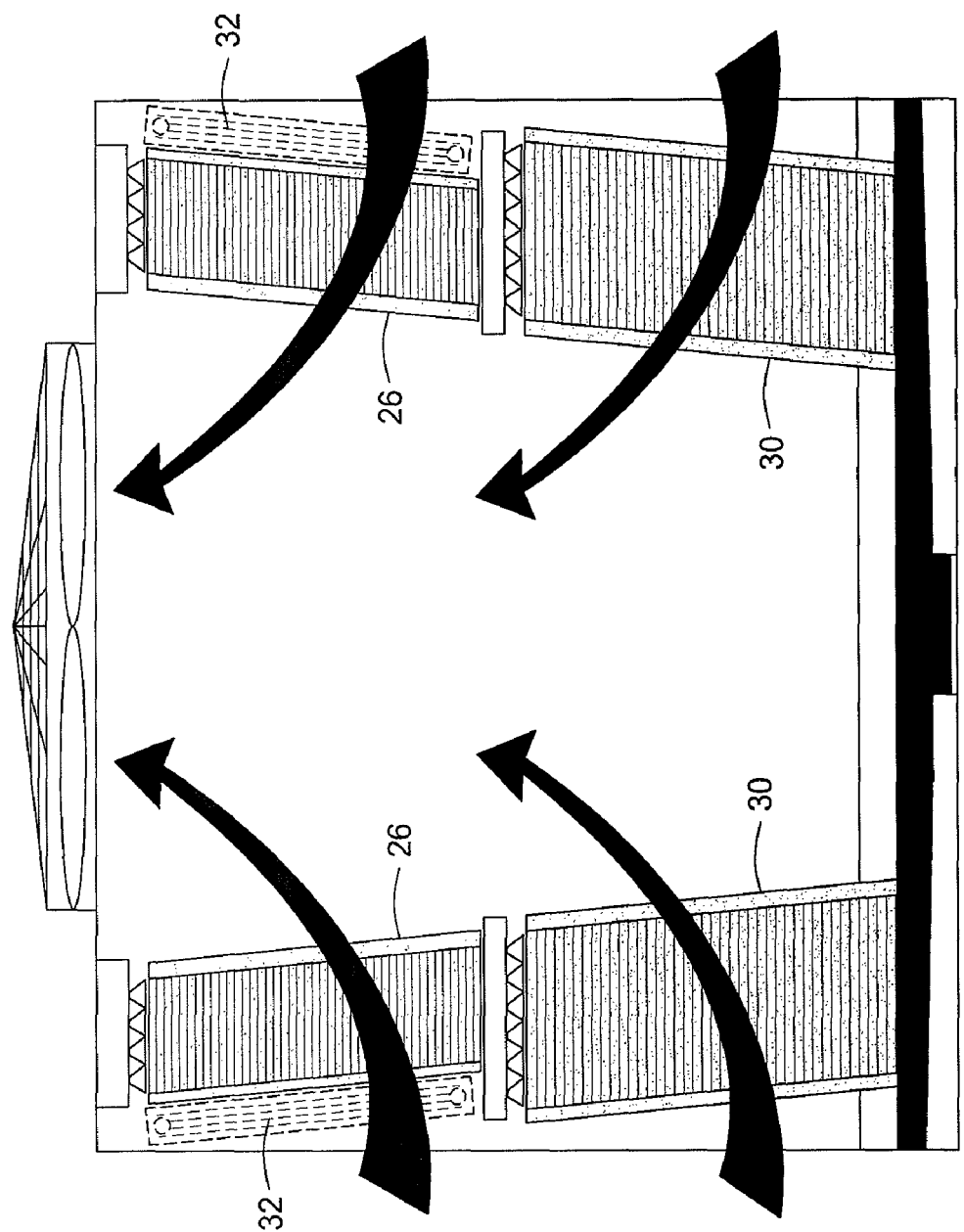
FIG. 2 is a diagrammatic air flow view corresponding to the view and embodiment of FIG. 1.
Figure 3:
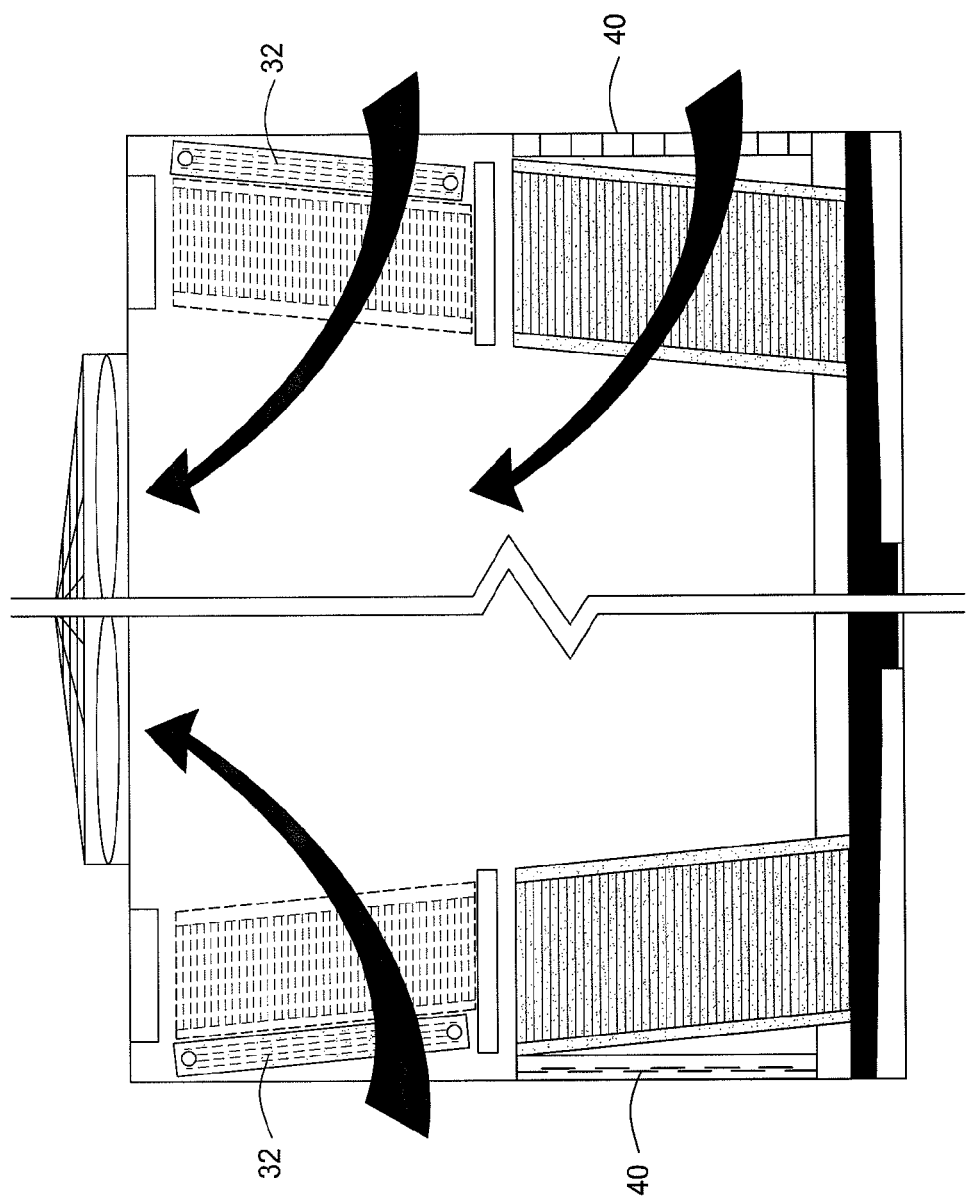
FIG. 3 is another diagrammatic air flow view corresponding to the view and embodiment of FIG. 1.

FIGS. 2 and 3 further illustrate the air flow through the system of FIG. 1 and also depict an arrangement wherein the lower air inlets of the tower feature dampers 40 that can be opened or closed. In FIGS. 2 and 3, dashed lines indicate a heat exchange media that is not in use, and the arrows represent active air flow paths. FIG. 2 shows a mode of operation where the water is being sprayed over the upper fill 26, is recollected and also passes through the lower fill 30. In FIG. 3 the left side shows a mode of operation which may for example be a purely closed dry configuration in which fluid is flowing only through the coil 32. Thus, the dampers 40 can be closed off and air is drawn only through the coil 32. This completely dry operation would be most desirable in the case of very cool conditions. In this mode shown on the left side of FIG. 3, the bypass valve 36 (see FIG. 1) is activated in the configuration of FIG. 3 so that the liquid also does not fall over the lower fill 30, although in some embodiments the water may fall over the tower fill. The right side of FIG. 3 shows a configuration in which the dampers 40 are open and air is flowing both over the coil 32 and the lower media 30.

This shows an operation wherein the upper section the coil 32 is being used, and in the lower half the fill media 30 is being used.

FIGS. 2 and 3 show the extreme end point modes, in which in the upper section of the tower all the water is passing through only one or the other of the evaporative media 26 (FIG. 2) or the coil 32 (FIG. 3). However, although not specifically depicted in its own figure, it will be appreciated that the control valve 20 is a continuously adjustable valve in some embodiments, so that any proportion of the water in the upper section of the tower may be passing through one or the other of the two upper fill media 26 and 32. Also, the bypass valve 36 can be a continuous adjustable valve to control a traditional flow through the lower media 30.

Figure 4:
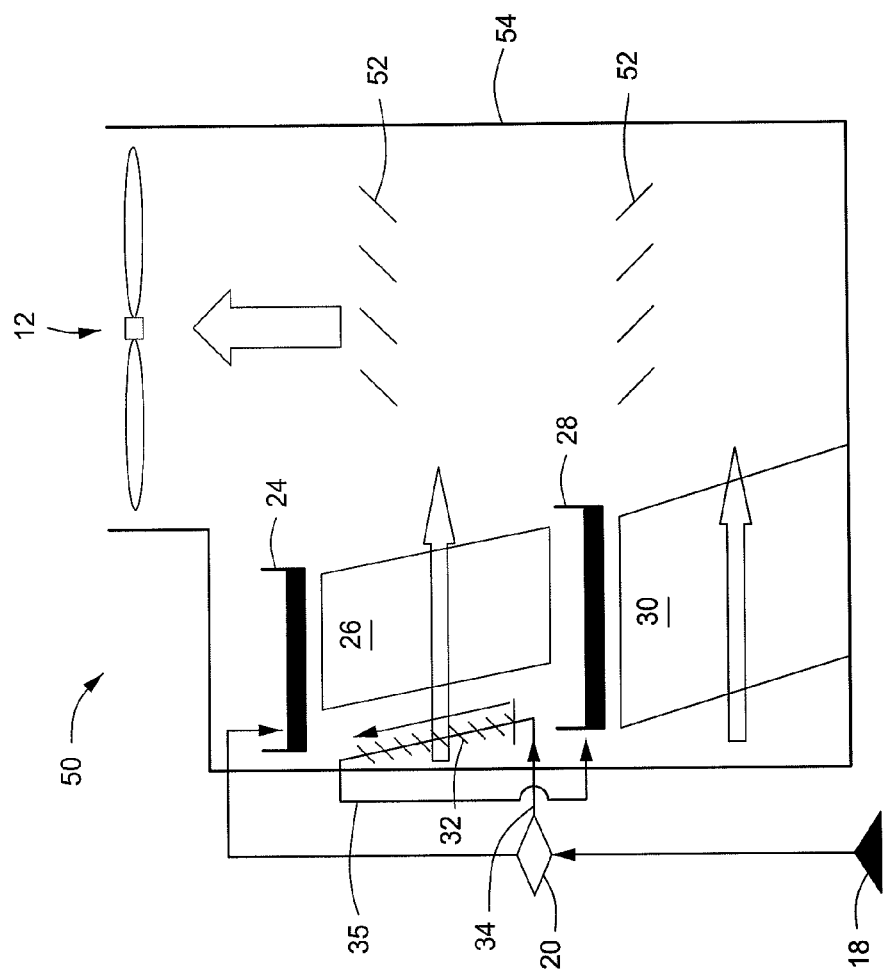
FIG. 4 is a schematic and cross-sectional view providing a diagram of a cooling tower according to a second preferred embodiment of the invention.

FIG. 4 is a view similar to FIG. 1, but shows a tower 50 that is essentially one-sided. The systems being depicted in FIG. 4 are thus similar to one side of FIG. 1 except that a solid end wall 54 is provided. FIG. 4 also schematically depicts the concepts of exit air mixing baffles 52. The air baffles 52 may be provided to enhance mixing of the upper air flow with the lower air flow before the air is exhausted from the tower. In some situations, the lower air flow may tend to have more water vapor suspended in it compared to the upper air flow, and if these paths remain unmixed, there can tend to be plume from the higher water vapor air flow. Mixing the air flows in some circumstances can thus reduce the plume overall. The baffles 52 are illustrated solely in a schematic nature, and any of the wide variety of air mixing baffles that are known could be utilized, as well as other air mixing baffles.

Figure 5:
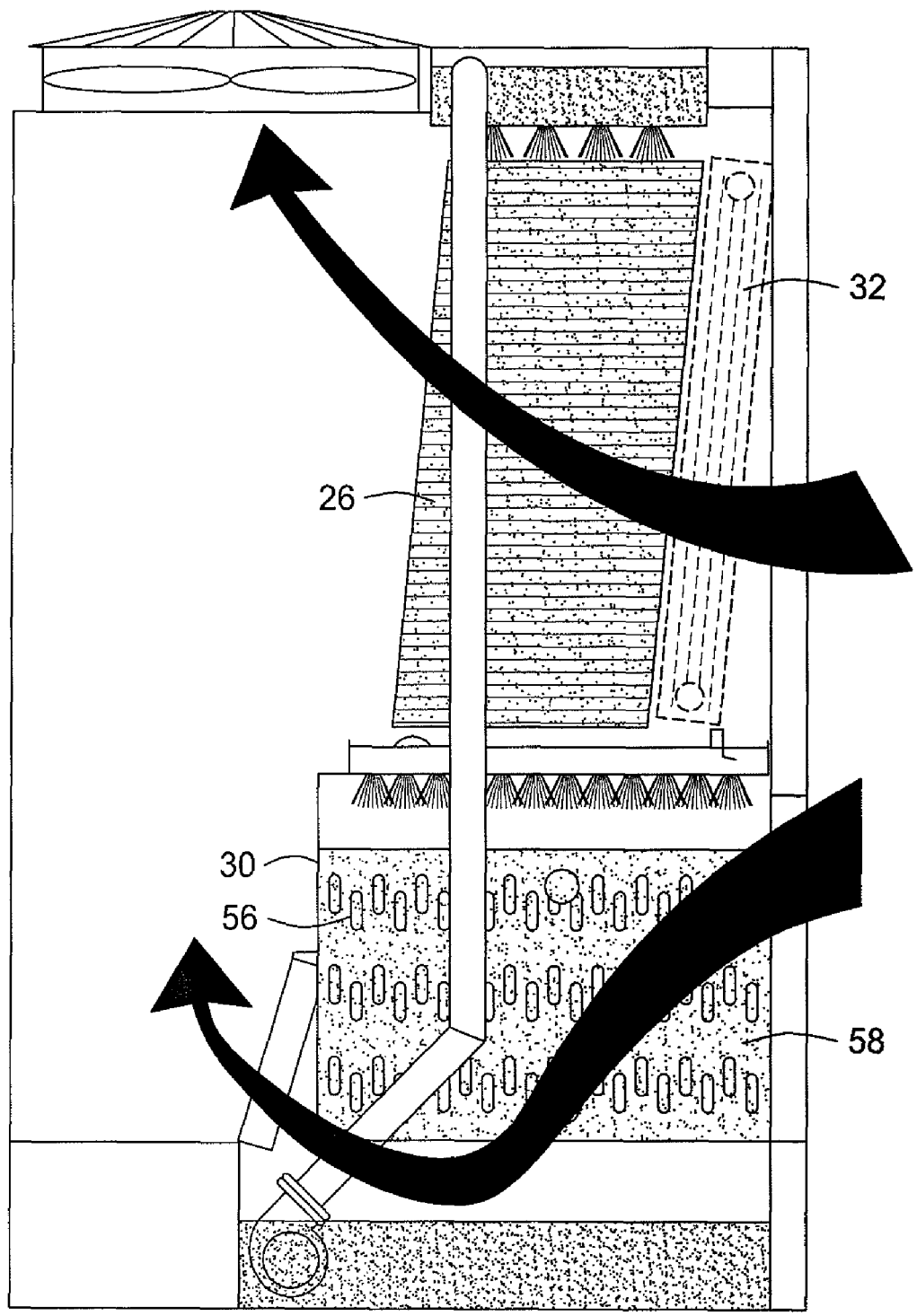
FIG. 5 is a diagrammatic air flow view corresponding to the view and embodiment of FIG. 4, and showing further variations.
Figure 6:
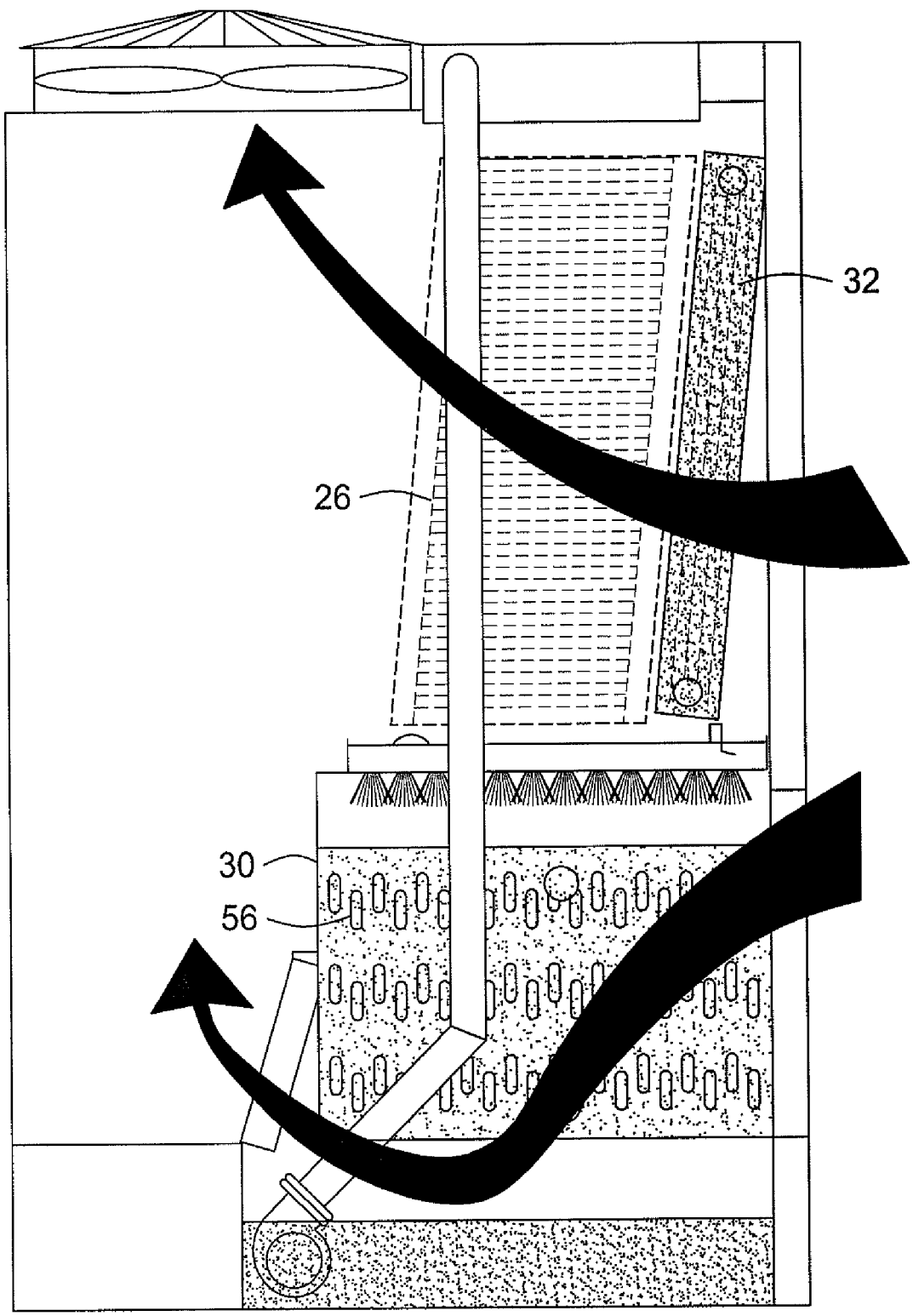
FIG. 6 is a diagrammatic air flow view corresponding to the view and embodiment of FIG. 4, and showing further variations.

FIGS. 5 and 6 illustrate a variant embodiment generally corresponding to FIG. 4. Also in FIGS. 5 and 6 dashed lines indicate a heat exchange media that is not in use, and the arrows represent active air flow paths. In this embodiment the lower fill media (30 in FIG. 4) is a coil circuit 56 which could incorporate an evaporative enhancing component 58, as disclosed in U.S. Pat. No. 6,702,004. In this embodiment, the process fluid at its warmest entering temperature can first enter the coil 56 in the lower section of the tower, then exit the coil 56 at a cooler temperature to be discharged or returned to the process equipment. The fluid passing through the coil 56 has its cooling enhanced by a second circuit of falling evaporative heat exchange water, which is being pumped from the lower water collection basin up into a top water distribution system 24. Thus, this system provides heat exchange to a primary fluid by virtue of the circulation of a secondary fluid through the tower. The secondary fluid flow is similar to that described for FIGS. 1-4.

Thus, FIGS. 5 and 6 illustrate an embodiment schematically as in FIG. 4, but with the addition of the lower coil circuit 56. Of course, an embodiment according to FIG. 1 can also be implemented with a lower coil similar to that illustrated in FIGS. 5 and 6 disposed with the lower fill media 30 of the embodiment of FIG. 1. In this way the above description for FIGS. 1-6 includes four sub-groups of embodiments, the embodiment of FIGS. 1-3 without the additional lower coil, the embodiment of FIG. 4 without the additional lower coil, the embodiment of FIG. 1 but also having an additional lower coil (not shown), and the embodiment of FIGS. 5-6 having an additional lower coil.

FIG. 5 shows the top section in evaporative mode, and FIG. 6 shows closed circuit mode for the top section. In both FIGS. 5 and 6 the lower section is active to pass water over the coils being cooled.

Figure 7:
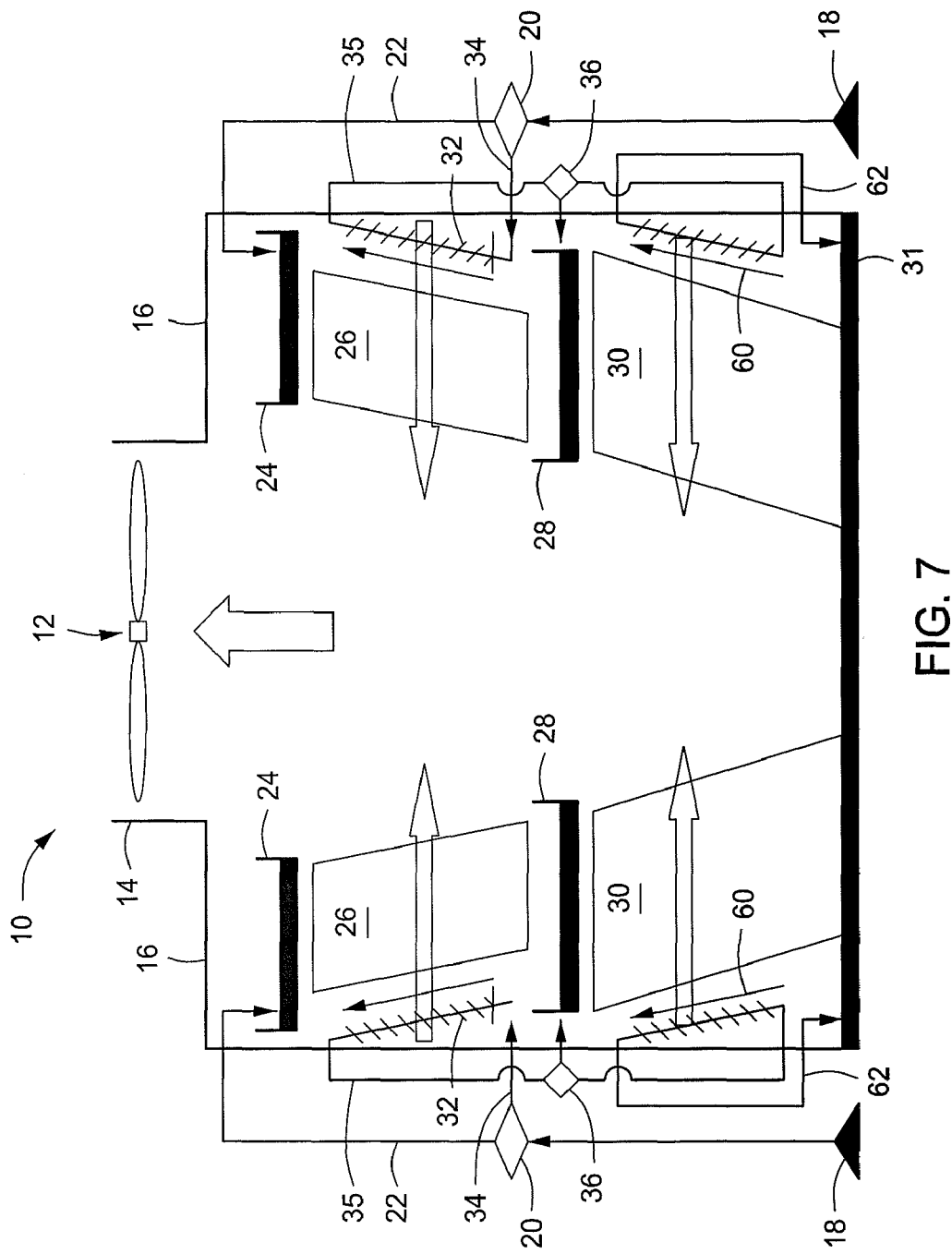
FIG. 7 is a schematic and cross-sectional view providing a diagram of a cooling tower according to another preferred embodiment of the invention.

FIG. 7 is a view similar to FIG. 1 but showing yet another alternative embodiment. In this embodiment, each side has a lower closed coil 60 opposed next to the lower heat transfer media 30. In the case where the lower heat transfer media 30 is an evaporative media, it will be appreciated that this entire lower cooling section in this embodiment operates similarly to the upper cooling section. That is, the valve 36 in this embodiment can be used to selectively direct fluid either into the intermediate collection basin 28 so that it (1) falls over the evaporative fill media 30 or (2) flows to the coil 60. In this way, the valve 36 would operate similarly in function to the valve 20. Valve 36 can be a continuous valve to direct a portion of the flow through one media and the rest through the other media. It will be appreciated that this embodiment can have a mode where it is run entirely as a "dry" cooling tower wherein valve 20 directs all of the fluid through the coil 32, and valve 36 directs all of the fluid through the coil 60. Fluid leaving the coil 60 is directed to the lower collection basin 31. Various embodiments according to FIG. 7 can be two-sided or one-sided, and use sheet media or coil media or the lower media 30.

It is believed that the above description fully describes components and operation of the system in detail with reference to the drawings. However, the discussion below even further describes the modes of operations of some embodiments of the system.

Taking the embodiment of FIG. 1 as an example, for near design heat load conditions, water passes from the control valve 20 to the top distribution basin 24 (bypassing the dry heat exchanger 32). The water then passes over the top evaporative fill 26 and into the re-distribution spray system 28 where it finally passes over the bottom evaporative heat exchanger 30.

In this example, for less than design heat load conditions, the valve 20 is opened to maintain a pre-determined cold water set point. The more the valve 20 is opened, the more water passes through the dry heat exchanger 32, and the warmer the water gets, less water is consumed by evaporation and less plume is generated as well. The more the valve 20 is closed, the more water passes over the evaporative heat exchanger 26, the cooler the water gets and more water is consumed and more plume is generated as well. A control system for actuating the valve 20 can be used to maintain at or near an optimum balance condition, or this can also be done manually. The air in the upper section thus moves through both evaporative and closed heat exchanges in a series path, but the upper and lower sections are therefore arranged as in a parallel path system. The ability to switch between evaporative and dry heat transfer, and do it gradually provides advantageous operation in the "shoulder" seasons.

The water from the dry coil 32 combines with the water from the upper evaporative heat exchanger 26 at the re-distribution basin 28 before passing over the bottom evaporative heat exchanger 30.

At far less than design heat load conditions, or at sufficiently cool conditions, the top evaporative heat exchanger 26 is completely bypassed so that no evaporation takes place. At this point all heat transfer in the top section is done through the dry heat exchanger 32. The bottom evaporative heat exchanger 30 can continue to operate, enabling the system to operate as a true parallel path wet dry cross flow cooling tower, or can be bypassed (with or without the addition of dampers).

For extreme cold conditions or for additional water conservation, air inlet dampers 40 can be placed at the bottom heat exchanger 30 as shown in FIG. 3. If water is completely bypassing the top evaporative heat exchanger 26, water temperature can be maintained at full fan speed by fully or partially closing the bottom heat exchanger dampers 40. This reduces the air flow, which reduces the heat transfer and conserves water, and reduces plume as well, maintaining full fan speed allows for maximum heat transfer through the dry heat exchanger 34. Once the dampers 40 are completely closed, the tower now operates in a completely dry mode. In this mode, very little water is consumed, and no plume is emitted.

Turning now to yet another variation which can be applied to any of the embodiments of the invention, although not specifically illustrated in any figure a variation is described in this paragraph. Each of the drawing figures illustrates the closed coil such as, for example, closed coil 32, being disposed outwardly or outbound of the evaporative film media 26. That is, in the embodiments that are illustrated in the configuration of the figures, the coil is closer to the air inlet, and closer to the outside of the tower, and the evaporative film media is inboard or closer to the center of the tower. However, the position of these elements can be reversed. That is, embodiments are possible where the coil is inbound of the evaporative film media. This can be advantageous in protecting the coils from environmental effects such as snow, ice, or wind-driven or falling debris such as tree branches or leaves. In some instances, the fill may be less expensive to replace than the coils. Further, if the fill is contacted by debris its effectiveness is generally affected only slightly, whereas if a coil is punctured, a leak can be very undesirable. Therefore, placing the fill towards the outboard as described in this paragraph may in some instances provide for a more weather and debris resistant configuration. The desirability of placing the coil inboard and the fill media outboard as described in this paragraph may also depend on whether external louvers are present on the outer side of the tower.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An atmospheric cooling tower apparatus, comprising:
 a housing structure having an air inlet and an air outlet;
 a first evaporative heat transfer media disposed in the housing;
 a closed coil heat transfer media disposed in the housing;
 a first water distribution assembly disposed above the first evaporative heat transfer media configured to distribute water onto the first evaporative fill heat transfer fill media;
 a first collection basin disposed beneath the first evaporative heat transfer media configured to collect water that has passed through the first evaporative heat transfer media;
 a first control valve that controls an inflow of water to supply water to one or both of the first evaporative heat transfer media and the closed coil heat transfer media, wherein the first control valve has one position where a first fraction of the water is supplied to the first evaporative heat transfer media, and another position where a second fraction of the water is supplied to the closed coil heat transfer media;
 a second evaporative heat transfer media disposed beneath the first collection basin, and further comprising a second collection basin below the second evaporative heat transfer media, wherein a second air path is defined between the first and second collection basins beneath the first air path and through the second evaporative heat transfer media, and wherein the first collection basin also is configured as a second water distribution assembly to distribute collected water onto the second evaporative heat transfer media;

wherein the closed coil heat transfer media and the first evaporative heat transfer media are disposed laterally next to each other and wherein a first air path is defined between the first water distribution assembly and the first collection basin, through the first evaporative heat transfer media, and through the closed coil heat transfer media.

2. The apparatus according to claim 1, wherein the first fraction is all of the water and the second fraction is all of the water.

3. The apparatus according to claim 1, wherein the first control valve is continuously variable between the first and second positions and also has a range of intermediate positions in which a fraction of the water is supplied to the first evaporative heat transfer media and the remaining fraction of the water is supplied to the closed coil heat transfer media.

4. The apparatus according to claim 1, wherein after the water passes through the closed coil heat transfer media, the water is directed to the first collection basin.

5. The apparatus according to claim 1, further comprising a second control valve that directs water exiting the closed coil heat transfer media into either the first collection basin or the second collection basin.

6. The apparatus according to claim 1, further comprising a second control valve that directs water exiting the closed coil heat transfer media into either the first collection basin or the second collection basin.

7. The apparatus according to claim 1, further comprising air dampers located on part of the air inlet next to the second evaporative heat transfer media.

8. The apparatus according to claim 1, wherein the first evaporative heat transfer media is a sheet pack type fill media.

9. The apparatus according to claim 1, wherein the second evaporative heat transfer media is a sheet pack fill media.

10. The apparatus according to claim 1, wherein the first and second air paths both exit the apparatus via the outlet, and wherein the apparatus further comprises baffles disposed between the first and second evaporative heat transfer media and the air outlet.

11. An atmospheric cooling tower apparatus, comprising:
a housing means having an air inlet and an air outlet;
a first evaporative heat transfer means disposed in the housing;
a closed coil heat transfer means disposed in the housing;
a first water distribution means disposed above the first evaporative heat transfer means configured to distribute water onto the first evaporative fill heat transfer fill means;
a first collection means disposed beneath the first evaporative heat transfer means configured to collect water that has passed through the first evaporative heat transfer means;
a first control valve means that controls an inflow of water to supply water to one or both of the first evaporative heat transfer means and the closed coil heat transfer means, wherein the first control valve means has one position where a first fraction of the water is supplied to the first evaporative heat transfer means, and another position where a second fraction of the water is supplied to the closed coil heat transfer means;
a second evaporative heat transfer means disposed beneath the first collection means, and further comprising a second collection means below the second evaporative heat transfer means, wherein a second air path is defined between the first and second collection means beneath the first air path and through the second evaporative heat transfer means, and wherein the first collection means also is configured as a second water distribution means to distribute collected water onto the second evaporative heat transfer means;

wherein the closed coil heat transfer means and the first evaporative heat transfer means are disposed laterally next to each other and wherein a first air path is defined between the first water distribution means and the first collection means, through the first evaporative heat transfer means, and through the closed coil heat transfer means.

12. The apparatus according to claim 11, wherein the first fraction is all of the water and the second fraction is all of the water.

13. The apparatus according to claim 11, wherein the first control valve means is continuously variable between the first and second positions and also has a range of intermediate positions in which a fraction of the water is supplied to the first evaporative heat transfer means and the remaining fraction of the water is supplied to the closed coil heat transfer means.

14. The apparatus according to claim 11, wherein after the water passes through the closed coil heat transfer means, the water is directed to the first collection means.

15. The apparatus according to claim 11, further comprising a second control valve means that directs water exiting the closed coil heat transfer means into either the first collection means or the second collection means.

16. The apparatus according to claim 11, further comprising a second control valve means that directs water exiting the closed coil heat transfer means into either the first collection means or the second collection means.

17. The apparatus according to claim 11, further comprising air dampers located on part of the air inlet next to the second evaporative heat transfer means.

18. The apparatus according to claim 11, wherein the first evaporative heat transfer means is a sheet pack type fill means.

19. The apparatus according to claim 11, wherein the second evaporative heat transfer means is a sheet pack fill means.

20. The apparatus according to claim 11, wherein the first and second air paths both exit the apparatus via the outlet, and wherein the apparatus further comprises baffles disposed between the first and second evaporative heat transfer means and the air outlet.

21. An atmospheric cooling method for a tower apparatus having a housing structure having an air inlet and an air outlet, comprising:
distributing water to a first evaporative heat transfer media disposed in the housing a first water distribution assembly disposed above the first evaporative heat transfer media configured to distribute water onto the first evaporative fill heat transfer fill media;
distributing water to a closed coil heat transfer media disposed in the housing;
collecting water using a first collection basin disposed beneath the first evaporative heat transfer media configured to collect water that has passed through the first evaporative heat transfer media; and
controlling an inflow of water to supply water to one or both of the first evaporative heat transfer media and the closed coil heat transfer media using a first control valve, wherein the first control valve has one position where a first fraction of the water is supplied to the first evaporative heat transfer media, and another position where a second fraction of the water is supplied to the closed coil heat transfer media;

distributing water to a second evaporative heat transfer media disposed beneath the first collection basin, and further comprising a second collection basin below the second evaporative heat transfer media, wherein a second air path is defined between the first and second collection basins beneath the first air path and through the second evaporative heat transfer media, and wherein the first collection basin also is configured as a second water distribution assembly to distribute collected water onto the second evaporative heat transfer media;

wherein the closed coil heat transfer media and the first evaporative heat transfer media are disposed laterally next to each other and wherein a first air path is defined between the first water distribution assembly and the first collection basin, through the first evaporative heat transfer media, and through the closed coil heat transfer media.

* * * * *